United States Patent
Poudyal et al.

(10) Patent No.: US 9,286,936 B1
(45) Date of Patent: Mar. 15, 2016

(54) ZONE BASED BAND MAPPING

(71) Applicant: Seagate Technology LLC, Cupertino, CA (US)

(72) Inventors: Sundar Poudyal, Boulder, CO (US); Ajay Narayan Kulkarni, Longmont, CO (US); Joseph Wach, Longmont, CO (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 185 days.

(21) Appl. No.: 13/773,362

(22) Filed: Feb. 21, 2013

(51) Int. Cl.
   *G06F 9/26* (2006.01)
   *G11B 20/12* (2006.01)

(52) U.S. Cl.
   CPC ............................... *G11B 20/1217* (2013.01)

(58) Field of Classification Search
   None
   See application file for complete search history.

(56) References Cited

U.S. PATENT DOCUMENTS

| | | | |
|---|---|---|---|
| 7,231,497 B2 | 6/2007 | Trika | |
| 7,440,221 B2 | 10/2008 | Tsuchinaga | |
| 7,965,465 B2 * | 6/2011 | Sanvido et al. | 360/60 |
| 7,966,456 B2 | 6/2011 | Trika | |
| 7,970,989 B2 | 6/2011 | Matthews | |
| 7,982,994 B1 | 7/2011 | Erden | |
| 8,179,627 B2 | 5/2012 | Chang | |
| 8,270,256 B1 | 9/2012 | Juang | |
| 8,300,341 B2 | 10/2012 | Itakura | |
| 8,310,786 B2 | 11/2012 | De La Fuente | |
| 2005/0144396 A1 | 6/2005 | Eschmann | |
| 2007/0174582 A1 * | 7/2007 | Feldman | 711/202 |
| 2011/0085266 A1 | 4/2011 | Kanai | |
| 2011/0138106 A1 | 6/2011 | Prabhakaran | |
| 2011/0231624 A1 * | 9/2011 | Fukutomi et al. | 711/162 |
| 2011/0292545 A1 | 12/2011 | Katada | |
| 2011/0299373 A1 | 12/2011 | Ho | |
| 2012/0060073 A1 | 3/2012 | Itakura | |
| 2012/0069466 A1 | 3/2012 | Okamoto | |
| 2012/0099216 A1 | 4/2012 | Grobis | |
| 2012/0162808 A1 | 6/2012 | Masuda | |
| 2012/0194937 A1 | 8/2012 | Tagami | |
| 2012/0212847 A1 * | 8/2012 | Sato et al. | 360/31 |
| 2012/0233432 A1 | 9/2012 | Feldman | |
| 2012/0250174 A1 | 10/2012 | Sueishi | |

(Continued)

OTHER PUBLICATIONS

Design Issues for a Shingled Write Disk System, Ahmed Amer, et al.; © 2010 IEEE.

(Continued)

*Primary Examiner* — Ryan Bertram
*Assistant Examiner* — Dustin Bone
(74) *Attorney, Agent, or Firm* — Cesari & Reed, LLP; Kirk A. Cesari; Christian W. Best

(57) ABSTRACT

Systems and methods for zone-based band mapping in a data storage device are disclosed. In one embodiment, a device may comprise a first data storage medium including a first band of tracks and a second band of tracks, each band of tracks including multiple adjacent tracks that are at least partially overlapped. The device may further comprise a processor configured to receive a write command to store received data to the first band of tracks, read previously stored data from the first band of tracks, modify the previously stored data with the received data to generate first modified data, write the first modified data to the second band of tracks, and assign a first data storage location indicator previously associated with the first band of tracks to the second band of tracks.

20 Claims, 6 Drawing Sheets

(56) References Cited

U.S. PATENT DOCUMENTS

| | | |
|---|---|---|
| 2012/0300328 A1* | 11/2012 | Coker et al. .................... 360/31 |
| 2012/0300333 A1 | 11/2012 | Tinker |
| 2012/0303867 A1 | 11/2012 | Hall |
| 2012/0303884 A1 | 11/2012 | Hall |
| 2012/0303889 A1 | 11/2012 | Coker |
| 2012/0303928 A1 | 11/2012 | Hall |
| 2012/0307400 A1 | 12/2012 | Kawabe |
| 2013/0027802 A1 | 1/2013 | Kim |
| 2013/0027806 A1 | 1/2013 | Cho |
| 2013/0031296 A1 | 1/2013 | Na |
| 2013/0031306 A1 | 1/2013 | Kim |
| 2013/0031317 A1 | 1/2013 | Ryu |
| 2013/0031406 A1 | 1/2013 | Cho |
| 2013/0038960 A1 | 2/2013 | Song |
| 2013/0038961 A1 | 2/2013 | Song |
| 2014/0108715 A1* | 4/2014 | Olbrich et al. ................ 711/103 |
| 2014/0115238 A1* | 4/2014 | Xi et al. ........................ 711/103 |
| 2014/0177085 A1* | 6/2014 | Haga et al. ..................... 360/48 |

OTHER PUBLICATIONS

Emulating a Shingled Write Disk, Rekha Pitchumani, et al., International Symposium on Modeling, Analysis, and Simulation of Computer and Telecommunication Systems, at Washington, DC (Aug. 2012).

* cited by examiner

ZONE BASED BAND MAPPING

BACKGROUND

The present disclosure relates to disc-based data storage mediums, and more specifically to disc memory having shingled magnetic recording (SMR). Systems and methods are provided for improving data storage device performance when using shingled magnetic recording.

SUMMARY

In one embodiment, a device may comprise a first data storage medium including a first band of tracks and a second band of tracks, each band of tracks including multiple adjacent tracks that are at least partially overlapped. The device may further comprise a processor configured to receive a write command to store received data to the first band of tracks, read previously stored data from the first band of tracks, modify the previously stored data with the received data to generate first modified data, write the first modified data to the second band of tracks, and assign a first data storage location indicator previously associated with the first band of tracks to the second band of tracks.

In another embodiment, a method may comprise receiving a write command to store received data to a first band of tracks of a first data storage medium, each band of tracks including multiple adjacent tracks that are at least partially overlapped, reading previously stored data from the first band of tracks, modifying the previously stored data with the received data to generate first modified data, writing the first modified data to a second band of tracks of the first data storage medium, and assigning a first data storage location indicator previously associated with the first band of tracks to the second band of tracks.

In yet another embodiment, a computer-readable storage device stores instructions which cause a processor to perform a method comprising receiving a write command to store received data to a first band of tracks of a first data storage medium, each band of tracks including multiple adjacent tracks that are at least partially overlapped. The method may further comprise reading previously stored data from the first band of tracks, modifying the previously stored data with the received data to generate first modified data, writing the first modified data to a second band of tracks of the first data storage medium, assigning a first data storage location indicator previously associated with the first band of tracks to the second band of tracks in a mapping table, and modifying the mapping table to indicate the first band of tracks is a spare band and is available for storing data.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Figure 1:
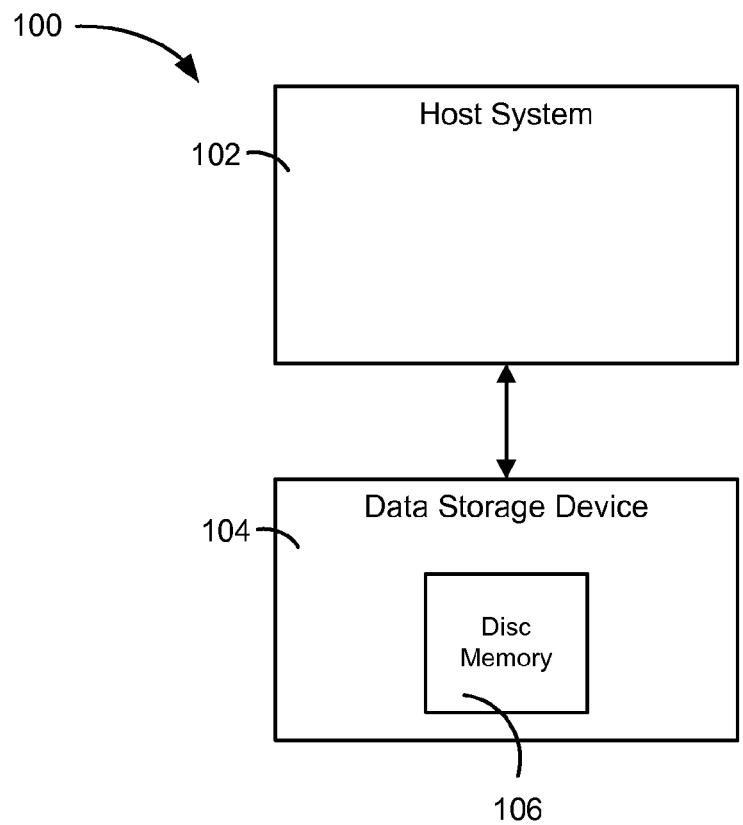
FIG. 1 is a diagram of an illustrative embodiment of a system of zone-based band mapping.

FIG. 1 depicts an embodiment of a system for zone-based band mapping, generally designated 100. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102, or the host 102 and DSD 104 may both be part of a single unit.

The DSD 104 can include one or more nonvolatile memories. In the depicted embodiment, the DSD 104 is a hard disc drive (HDD) including a rotating disc memory 106. In other embodiments, the DSD 104 may contain additional memories or memory types, including volatile and nonvolatile memories. For example, DSD 104 could be a hybrid HDD with both a disc memory and a nonvolatile solid state memory.

In an embodiment of system 100, the disc memory 106 has one or more zones configured to store data on shingled data tracks using shingled magnetic recording (SMR). SMR is a recording method to increase data recording density on a disc, whereby a track of data partially overlaps an adjacent data track. SMR will be discussed in more detail with regard to FIGS. 2-4.

Figure 2:
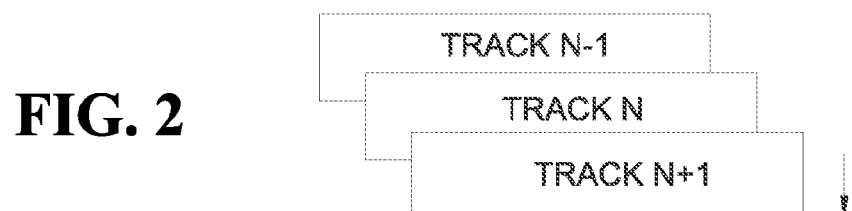
FIG. 2 is a diagram of another illustrative embodiment of a system of zone-based band mapping.

SMR is a scheme of executing a write operation in one radial direction across a disc, where tracks partially overlap each other similar to roofing shingles. Referring to FIG. 2, if it is assumed that writing is performed in an arrow-indicated direction in the shingle-write scheme, when writing is performed on track N, adjacent track N−1 is partially overwritten. Also, when writing is performed on track N+1, adjacent track N is partially overwritten. In contrast to recording methods whereby each track is written without any intended overlap, SMR can result in an increase of the tracks per inch (TPI) characteristic as a recording density in a radial direction of a storage medium.

Figure 3:
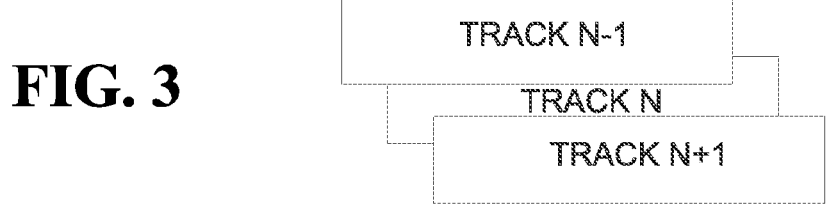
FIG. 3 is a diagram of another illustrative embodiment of a system of zone-based band mapping.

SMR can generate flux in one direction. Therefore, a constraint that N−1 track cannot be written after the N track is written should be met. As illustrated in FIG. 3, after writing on track N, if track N−1 is written in a reverse direction of the shingled recording direction, track N may become unreadable due to Adjacent Track Interference (ATI).

Therefore, changing the data recorded to track N−1 after track N is recorded, or the data recorded to track N after track N+1 is recorded, requires a different writing strategy than with non-shingled tracks, which can simply be overwritten at any time.

Figure 4:
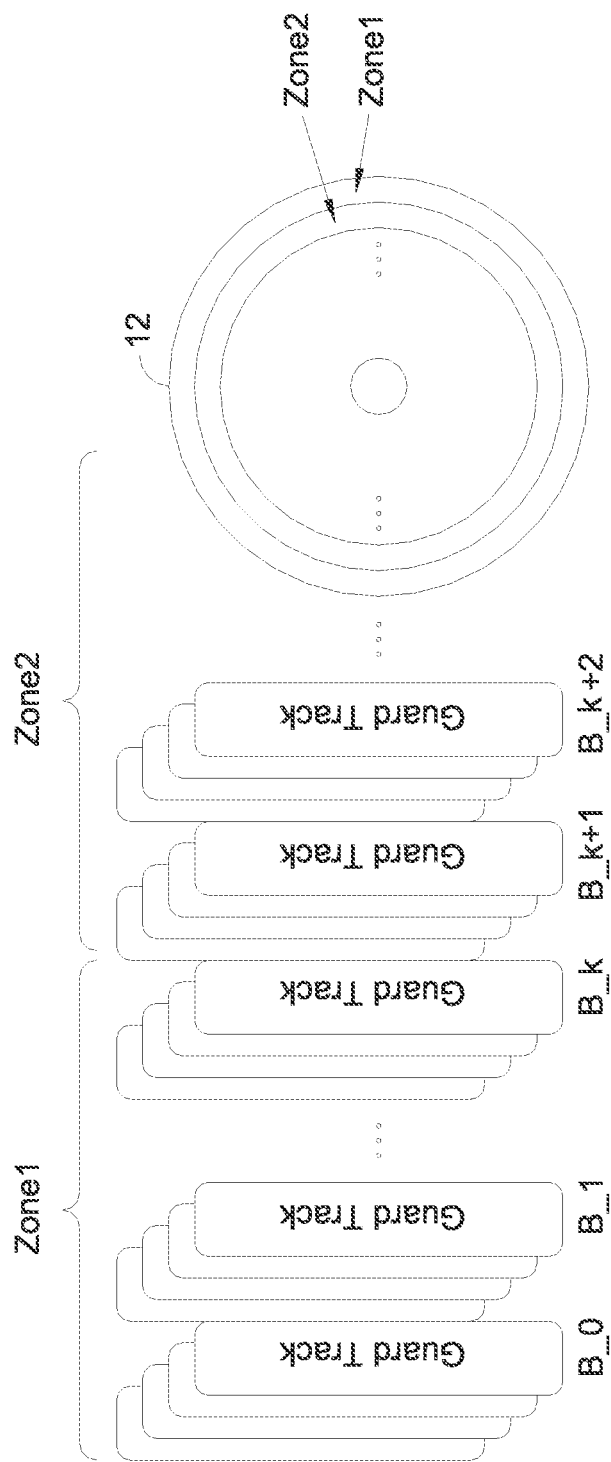
FIG. 4 is a diagram of another illustrative embodiment of a system of zone-based band mapping.

Turning now to FIG. 4, a diagram of another illustrative embodiment of a system of zone-based band mapping is depicted. Rotating disc media 12 may be divided into a plurality of zones (e.g. Zone 1, Zone 2, etc.), and each zone may contain a plurality of data tracks.

Due to the single-write direction of SMR, writing a given track N−1 after track N has been written may require rewriting all shingled tracks that following track N−1 (i.e. track N, track N+1, track N+2, etc.). In order to accomplish this realistically, a set of tracks may be grouped into a "band," with the band ending with a guard track. In some embodiments, the guard track can be a non-shingled track, or a shingled track which is not used to record data. When track N−1 needs to be re-written, tracks N−1 through the Guard Track can be rewritten, while tracks in other bands are not affected. Accordingly, the tracks in each zone may be divided into a plurality of bands. As depicted in the example embodiment of FIG. 4, Zone 1 contains Band 0 (B_0) through Band k (B_k), while Zone 2 contains Band k+1 (B_k+1), Band k+2 (B_k+2), etc. In an example embodiment, each zone may contain 100 data tracks, and the 100 data tracks are divided into 10 bands containing 10 tracks each. Each track can be further divided into a plurality of logical block addresses (LBAs), with chunks of data written to each LBA.

In an embodiment, a DSD employing SMR receives a write command to overwrite one or more shingled tracks in a band. The data to be written may come from a host device, a media cache of the DSD, or another location. In order to perform the write command, it may be necessary to read multiple tracks of the band, modify the read data based on the write command, and then write the modified data back to a band. This can be called a Read-Modify-Write operation (RMW), or more specifically for SMR devices, a Banded Read-write Operation (BRO). Data read from the tracks may be temporarily stored in a volatile memory, such as a buffer or register, where it is modified before being written back to a band.

If a write command includes LBAs associated with data sectors of tracks in Band 1, for example, data would be read from Band 1 to volatile memory, and modified according to the write command. If the DSD starts writing the modified data back to Band 1 and an unexpected power failure occurs, some data may be irretrievably lost. For example, if track N had been partially written when the power failure occurred, track N+1 may be unreadable due to adjacent track interference. Since the contents of track N+1 in the volatile memory would be lost as well, there may be no way to recover the data from track N+1.

One method of avoiding such a problem is to perform a read-modify-write-write (RMWW) instead of a RMW operation. This can involve reading the data from Band 1, modifying the data, and writing the modified data to an available nonvolatile memory area that is not Band 1. In an embodiment, this may be a dedicated area called a "scratch pad," which can be an area on the disc, a different nonvolatile memory such as Flash memory, or any combination thereof. After the data has been written to the scratch pad, it may be safely written to Band 1. If a power loss occurs during the write to the scratch pad, the original data is still safe in Band 1. If a power loss occurs during the write to Band 1, the modified data is secure in the scratch pad. This method is safe, but requires extra processing time to perform two write operations of potentially an entire band of tracks. This may cause host commands to time out, or otherwise slow device performance.

Figure 5:
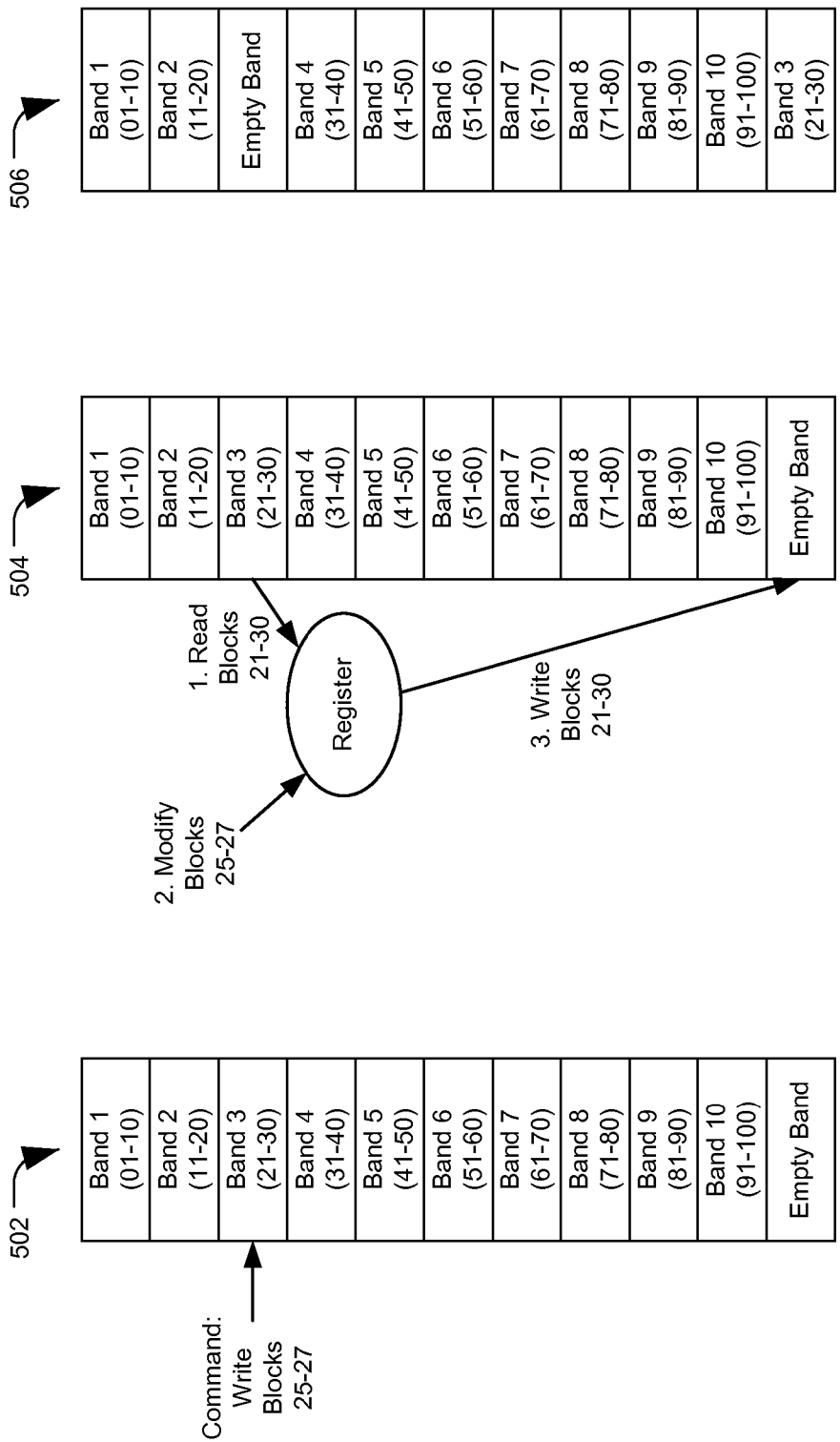
FIG. 5 is a diagram of another illustrative embodiment of a system of zone-based band mapping.

An alternative solution involves dynamically mapped bands within the zones. Turning now to FIG. 5, a diagram of another illustrative embodiment of a system of zone-based band mapping is depicted. FIG. 5 depicts three states of a method for writing to bands in an example zone including a first state 502, a second state 504, and a third state 506. In the depicted embodiment, the example zone may be an example of a zone from a freshly formatted disc, and may comprise 11 bands. The zone may be mapped with bands numbered 1 to 10 followed by an empty band, with each band containing 10 LBAs (i.e. Band 1 has LBAs 01-10, Band 2 has LBAs 11-20, etc.). The bands need not be numbered 1-10, and can be mapped with any logical identifier (e.g. A-J). The "empty band," which can also be called a spare band or a free band, does not need to be empty of data, and can be any spare band available for storing data, even if it contains old or invalid data. The overall capacity of a zone visible to a host may be the capacity of all the bands, reduced by at least the capacity of any spare zones.

In the example of FIG. 5, a write command is received at state 502 involving LBAs 25-27, which are contained in Band 3. As shown in state 504, a RMW operation may be performed where the entire Band 3 is read into a register, modified with the new data for blocks 25-27, and the newly modified blocks 21-30 are written back to the zone. However, instead of writing back to the original Band 3, the data is written to the Empty Band. A mapping data structure can be used to track the "sequence" of bands within the zone. As shown in state 506, after writing, the Empty Band is remapped within the zone as Band 3, while the former Band 3 is remapped as the Empty Band. LBA information should not be required within the mapping structure, as logically sequential bands will have sequential LBAs (e.g., Band 1 will always have LBAs 01-10, while Band 2 will always have LBAS 11-20, even if Band 2 does not physically follow Band 1 on the disc.). In some embodiments, all bands within a zone are of an equal size, so that every band has sufficient capacity to hold all the data from any band. This allows any band to become a spare band.

According to this method, if power is lost while writing to the Empty Band, the original data is still secure in the original Band 3. This method therefore preserves data integrity in case of a power loss without requiring an extra write operation.

Figure 6:
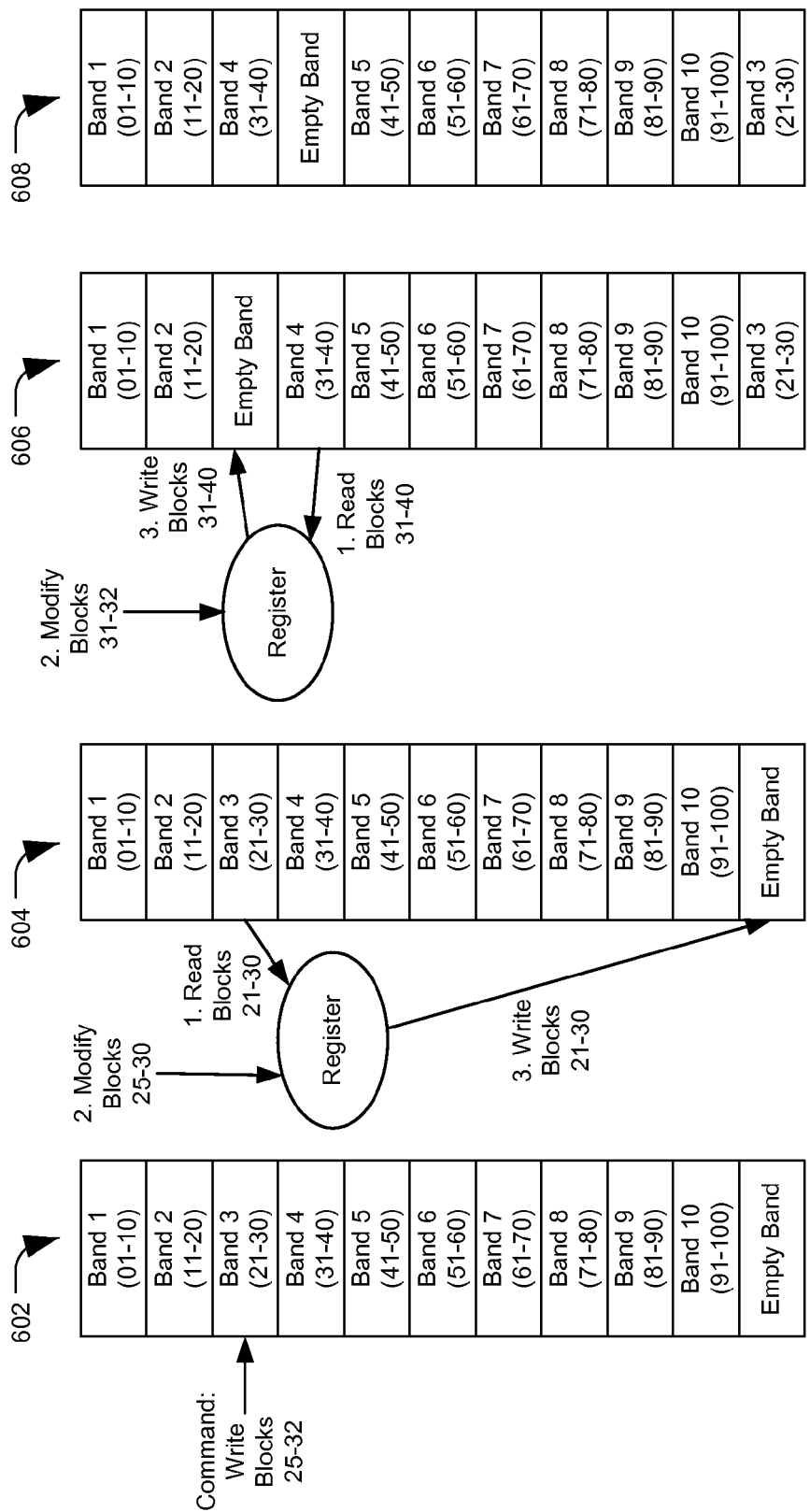
FIG. 6 is a diagram of another illustrative embodiment of a system of zone-based band mapping.

FIG. 6 depicts an illustrative embodiment of zone-based band mapping where the LBAs of the write command spans multiple bands. FIG. 6 depicts four states of a method for writing to bands in an example zone including a first state 602, a second state 604, a third state 606, and a fourth state 608. In the first state 602, a DSD employing SMR may receive a write command from a host for blocks 25-32. A processor or controller of the DSD may determine, such as via a mapping table, that this includes LBAS 25-30 of Band 3 and LBAS 31-32 of Band 4. The processor may then break the write into two operations; one for Band 3, and one for Band 4.

In the second state 604, Band 3 may be read, modified, and written to the Empty Band, such as described in FIG. 5. Then, the previously Empty Band can be assigned as Band 3 and the former Band 3 can be assigned as the new Empty Band, as shown in the third state 606. Also, in the third state 606, the second half of the write operation can be performed, where Band 4 may be read and modified with the data for LBAs 31-32. The modified data for Band 4 can now be written to the Empty Band, which was formerly Band 3. In the fourth state 608, the Empty Band can now be remapped as Band 4, and the former Band 4 is mapped as the new Empty Band.

The process of swapping bands to be written with Empty bands can be repeated for write operations involving a greater number of bands. Also, using such methods described herein, a RMW operation to an empty band may be employed whether the target band of a write operation is a full band or a partially filled band. Further, Zone-based band mapping can be especially important for write-cache disabled (WCD) systems, to perform writes more quickly without risking data loss.

The methods and systems described herein can protect data during a power loss. However, a data map may need to be rebuilt after a power loss. In the event of unexpected power loss during a band write, the data for the band should be in two places—the band which was being written when power loss happened (i.e. the Empty Band) and the band from which the BRO originated. Thus, the Empty Band may be partially written and a solution may be needed to identify the point up to which the data was written in a new band.

An example solution is to use a virtual seeding method for writes. In one embodiment, each band write can be performed with a unique seed which is incremented from one band write operation to the next band write operation for band write operations on the same band. A unique seed or seed value can be any indicator of uniqueness when compared with another seed; for example, the seed may be a numeric value that provides a distinct value for each corresponding operation, although after a period of time or number of operations the values could be reused based on the needs of the system. Thus, following an asynchronous power loss, a band which was being written can be scanned, and a difference in the seed value between the current write and the previous write may be detected to determine a point up to which the new data may have been written.

In an example embodiment, a band write has started with a seed of 4, and then a power loss occurs. During recovery from the power loss, the Empty Band (which was being written during power loss) may be read to determine a point of power loss by looking at the data seed. The last LBA written just before the power loss will have a seed of 4 and the next LBA will have seed 3, indicating that it is older data. The system may then look to the original band for the rest of the data.

The implementation details of seed usage and storage can vary. One way is to store the seed in nonvolatile memory. However to avoid this seed saving for efficiency reasons, another way may entail generating a random seed for each band write. For example, a 16-bit seed provides 65,535 possible seeds. The likelihood of a repeated seed happening in the same band when power loss happens during write, though possible, is very minimal. This probability can further be asymptotically diminished using longer seeds (32 bit e.g.). The seed would not need to be stored, as the system can simply check for which seed was used to save the first LBA of the Empty Band, and read up to the point where the seed changes. Yet another way is to save a seed value when the drive goes into Advanced Power Management (APM), receives a cache flush command (as a part of formal power down by host), or other triggers, and loading this value after powering on. On power loss, spindle back EMF can be used to move this value into nonvolatile memory in a process also known as SCRAM.

Part of power on reconstruction may be to read the band map and determine which band was the target of the last write operation, and which band was the Empty Band being written with the modified data when the power loss occurred. The system could then finish the write using data from the target band of the write operation. At any given time, there may be only one such incomplete write operation. For example, if a large write operation was broken into three smaller write operations to bands 1, 2, and 3, these writes may be performed one at a time, so only one write would be interrupted by a power loss. Even if the entire write command from a host was not completed, for example, there would not be any permanent data loss of the old data stored in the bands.

In another embodiment, after a power loss the system can assume the data from the old band is current data. That is, if data was to be written to Band 3 and the RMW operation to the Empty Band was not completed, any data written to the Empty Band would be disregarded, and no change between Band 3 and the Empty Band would be recorded in the mapping table. This would avoid the complexity of determining the status of a partially-written band, as unexpected power losses are a rare event. This would potentially lose modified data from the write command that had been successfully recorded to the empty band, but it would avoid a situation where new data a write command had only been partially completed. A partially completed write command could result in uncertainty regarding what data was old and what data was up-to-date based on the write command.

During operation of a DSD, the data map for the bands in each zone can be saved to a nonvolatile memory, or a specific area of a nonvolatile memory, based on various triggers. For example, it can be saved on power mode commands changing the power use behavior of the device, such as when the drive enters Advanced Power Management (APM) which can be triggered, e.g., after a certain amount of device idle time. Other triggers for saving the map may be after a certain period of time, when no command has been received at the drive for a period of time, after a number of write commands have been executed, when a write cache disabled write overlaps an existing entry in the media cache (MC), on completion of a BRO, RMW, or RMWW operation, other triggers, or any combination thereof.

Figure 7:
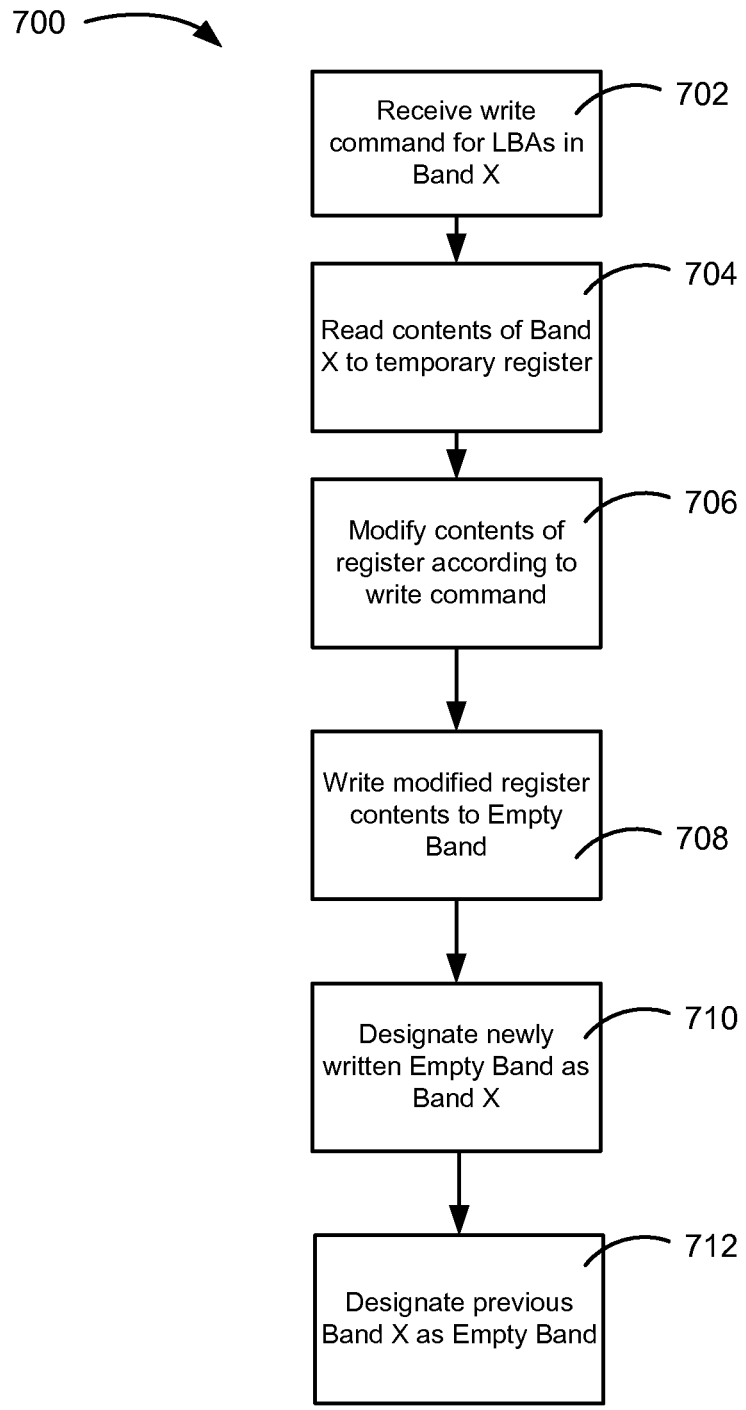
FIG. 7 is a flowchart of an illustrative embodiment of a method employing zone-based mapping.

FIG. 7 depicts a flowchart of an illustrative embodiment of a method employing zone-based mapping, generally designated 700. At 702, a system configured to utilize shingled magnetic recording (SMR), such as a data storage device (DSD), may receive a write command for a set of LBAs located in a given band, Band X. The write command may have come directly from a host device, or it may involve data from a media cache. For example, a DSD may receive numerous write commands from a host and write the data to a media cache, then organize the data for efficient write operations. The DSD may issue write operations to the main storage media including data from multiple host write commands.

After receiving a write command for Band X, the DSD may read the contents of Band X to a memory of the system, such as a register or Dynamic Random Access Memory (DRAM), at 704. Next, the DSD may modify the data in the memory according to the data received with the write command, at 706. The DSD may then write the modified data from the memory to an Empty Band, at 708.

The Empty Band may be located in the same zone of a disc memory as Band X. In some embodiments, there may be one or more Empty Bands in a zone, with an "Empty Band" meaning a band that has not been previously assigned to store user data intended for the respective zone. Thus, the Empty Bands may be considered "spare bands". Designated bands may be assigned a band number, whereas Empty Bands may be without a designated band number. As such the designated bands of a zone may be numbered whether or not they contain any valid data.

In some embodiments, a freshly formatted disc may have zones containing entirely empty bands. As data is written to bands, they may be assigned designated band numbers until a zone contains only one empty band. A DSD may be configured to maintain at least one empty band per zone for use in BROs.

The DSD of method 700 may designate the newly written Empty Band as Band X, at 710. The previous Band X may now be designated as the new Empty Band for the zone, at 712. The redesignation of the Empty Band and Band X may involve updating a band map or other data map to reflect the new band configuration within the zone. Therefore, steps 710 and 712 may be performed at substantially the same time, such as during a single map update operation.

Figure 8:
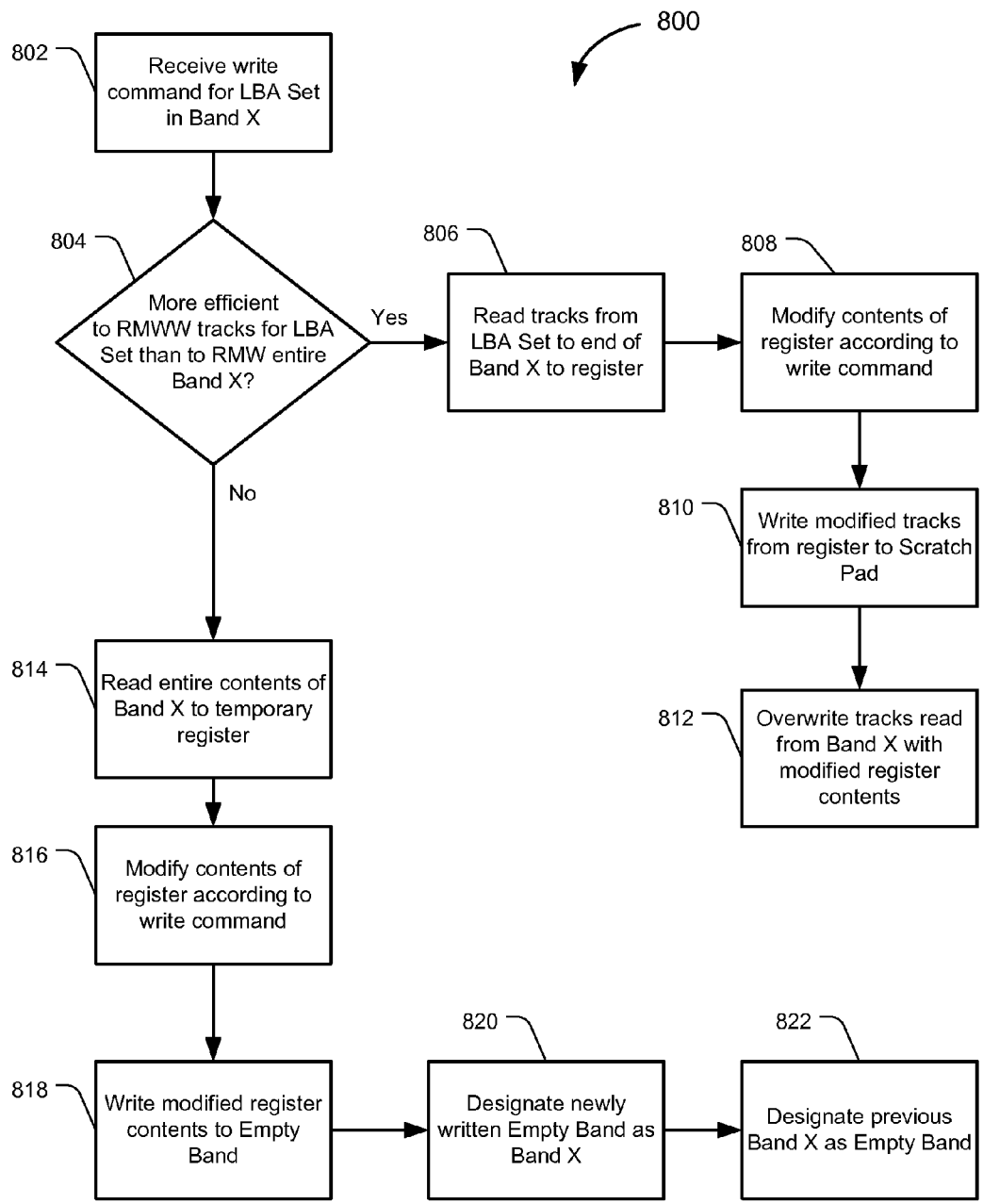
FIG. 8 is a flowchart of another illustrative embodiment of a method employing zone-based mapping.

In some embodiments, a device employing SMR may utilize both the RMW operation from a given band to the empty band as described herein, as well as the RMWW operation using a scratchpad as described previously. Which operation is employed may depend on the specifics of one or more write commands. By way of example, FIG. 8 depicts a flowchart of another illustrative embodiment of a method employing zone-based mapping, generally designated 800.

During the method 800, a system configured to utilize SMR, such as a DSD, can receive a write command for a set of designated LBAs located in a given band, Band X, at 802. Then, the DSD can determine whether it would be more efficient to perform a RMWW using a scratch pad for the tracks of Band X containing the designated LBAs, than it would be to perform a RMW on the entire band.

For example, Band X may contain 20 tracks of data, and the designated LBAs to be modified according to the write command may be located in the last 3 tracks before the guard track. Using RMWW, the DSD could read the last 3 tracks, modify the designated LBAs, write those modified three tracks to a scratchpad to protect the data from power loss, then write those last 3 tracks back to Band X, for a total of 6 total track writes. The other tracks in Band X should not be corrupted because writing was only performed in the proper direction toward the guard track. By contrast, a RMW from Band X to the Empty Band would require reading and then writing all 20 tracks of Band X. In such a situation, the RMWW with 6 written tracks is more efficient than the RMW with 20 written tracks.

The DSD may determine which operation is more efficient by comparing the number of tracks required to be written using RMWW against a threshold. For example, if bands contain 20 tracks, RMWW may only be employed if the designated LBAs are contained within a threshold of the last 10 tracks of a given band. That would entail 20 total writes in a RMWW, after which point a RMW would be more efficient.

Other factors may also be considered or factored into a threshold when deciding whether to employ RMW or RMWW, such as seek time between the target band and the empty band or scratch pad. In some examples, a scratchpad may be large enough to store multiple bands of data. A write operation involving four bands may need to be divided into four separate write operations using RMW, but may be able to be handled as one operation if the scratch pad can store four bands' worth of data.

If the DSD determines that a RMWW operation is more efficient at 804, the DSD can read the tracks, beginning with those containing the designated LBAs up through the final track of Band X, to the data register, at 806. The DSD can modify the contents of the register according to the write command, at 808. The DSD may write the modified contents of the register to a scratch pad memory, at 810. As discussed, the scratch pad may be located in a separate nonvolatile (NV) memory from the disc, such as a Flash memory, or it may be a portion of the disc memory. Then, the DSD can overwrite the tracks read from Band X with the modified data from the register, to complete the RMWW operation, at 812. In such an embodiment, the band map would not need to be changed, as the bands designations have not changed.

If the DSD determines that it would not be more efficient to perform the RMWW at 804, the device may perform a RMW instead. The DSD can read the entire contents of Band X to the register, at 814. The data in the register may be modified according to the write command at 816. The modified register contents can be written to an Empty Band, at 818. Newly written Empty Band can be designated as Band X in the band map, at 820, and the previous Band X can be designated as the Empty Band, at 822.

In some embodiments, a combination of both RMWW and RMW may be employed to execute a write command. For example, a write command may be received to write LBAs 15-38, where Band 1 contains LBAs 01-20, and Band 2 contains LBAs 21-40. The DSD may split the write command into two operations based on the Bands; 1 write operation for LBAs 15-20, and one write operation for LBAs 21-38. In this example, it may be more efficient to perform a RMWW for Band 1 (only the last 5 of 20 LBAs need to be modified), and a RMW for Band 2 (the first 18 LBAs of 20 need to be modified).

In accordance with various embodiments, the methods described herein may be implemented as one or more software programs running on a computer processor or controller. In accordance with another embodiment, the methods described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods described herein. Further, the methods described herein may be implemented as a computer readable medium including instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
   a first data storage medium including:
      a first band of tracks and a second band of tracks, each band of tracks including multiple adjacent tracks that are at least partially overlapped;
   a processor circuit configured to:
      receive a write command to store received data to the first band of tracks;

determine whether target logical block addresses (LBAs) corresponding to the received data are located in a number of last tracks "X" of the first band of tracks;
read previously stored data from the first band of tracks;
modify the previously stored data with the received data to generate first modified data;
determine whether to write the first modified data to the first band of tracks or the second band of tracks based upon whether the target LBAs are located in the last X tracks of the first band of tracks; and
write the first modified data to the determined first band of tracks or second band of tracks.

2. The device of claim 1, further comprising:
the processor circuit further configured to:
maintain a band mapping table to indicate locations of data storage addresses assigned to each band, the first band of tracks having assigned first data storage addresses;
after writing the modified data to the second band of tracks, modify the band mapping table to assign the first data storage addresses previously associated with the first band of tracks to the second band of tracks; and
modify the mapping table to indicate the first band of tracks is a spare band and is available for storing data.

3. The device of claim 1, further comprising:
a nonvolatile memory including a scratch pad area, a scratch pad being an area of memory reserved for temporary storage during band writing operations;
the processor circuit configured to determine whether to write the first modified data to the first band of tracks or the second band of tracks based upon whether the target LBAs are located in the last X tracks of the first band of tracks, including:
when the target LBAs are not in the last X tracks, perform a first operation including:
read the previously stored data from the first band of tracks;
generate the first modified data;
write the first modified data to the second band of tracks;
when the target LBAs are in the last X tracks, perform a second operation including:
read target data from a first track containing the target LBAs of the first band of tracks to a last track of the first band of tracks;
modify the target data with the received data to generate second modified data;
write the second modified data to the scratch pad area; and
write the second modified data to the first band of tracks.

4. The device of claim 3, further comprising X equals less than half the total number of tracks in the first band of tracks.

5. The device of claim 1, further comprising:
an interface to communicate with a host device; and
the processor circuit further configured to receive the write command via the interface.

6. The device of claim 1, further comprising the processor circuit further configured to:
determine if the write command will require writing to multiple bands;
when the write command requires writing to multiple bands, split the write command into operations for each of the multiple bands; and
execute the operations on the multiple bands.

7. The device of claim 1, further comprising:
the first data storage medium is divided into a plurality of zones, at least one zone includes a plurality of bands including the first band of tracks and the second band of tracks.

8. The device of claim 7, further comprising:
a usable storage capacity of a zone that is available to store data includes the storage capacity of the plurality of bands in the zone reduced by at least the capacity of spare bands in the zone.

9. The device of claim 1 further comprising the first data storage medium including a spacing between adjacent bands of tracks such that no tracks in any band overlap tracks in another band.

10. The device of claim 1 further comprising the first band of tracks and the second band of tracks each have sufficient capacity to hold all the data from the other band, in order to allow swapping of data between bands.

11. A method comprising:
receiving a write command to store received data to a first band of tracks of a first data storage medium, each band of tracks including multiple adjacent tracks that are at least partially overlapped;
reading previously stored data from the first band of tracks;
modifying the previously stored data with the received data to generate first modified data;
determining whether to write the first modified data to the first band of tracks or a second band of tracks not including tracks from the first band of tracks based upon whether target logical block addresses (LBAs) corresponding to the received data from the write command are located within a number of last tracks of the first band of tracks; and
writing the first modified data to the determined first band of tracks or second band of tracks.

12. The method of claim 11, further comprising:
maintaining a band mapping table to indicate locations of data storage addresses assigned to each band, the first band of tracks having assigned first data storage addresses;
after writing the modified data to the second band of tracks, modifying the band mapping table to assign the first data storage addresses previously associated with the first band of tracks to the second band of tracks; and
modifying the mapping table to indicate the first band of tracks is a spare band and is available for storing data.

13. The method of claim 11, further comprising:
determining whether target logical block addresses (LBAs) corresponding to the received data from the write command are located in the last X tracks of the first band of tracks, where X is a number of tracks;
when the target LBAs are not in the last X tracks, performing a first operation including:
reading the previously stored data from the first band of tracks;
generating the first modified data;
writing the first modified data to the second band of tracks;
assigning a first data storage location indicator previously identifying the first band of tracks to identify the second band of tracks;
when the target LBAs are in the last X tracks, performing a second operation including:
reading target data from a first track containing the target LBAs of the first band of tracks to a last track of the first band of tracks;

modifying the target data with the received data to generate second modified data;

writing the second modified data to a scratch pad, a scratch pad being an area of nonvolatile memory reserved for temporary storage during band writing operations; and writing the second modified data to the first band of tracks.

14. The method of claim 11, further comprising:

determining if the write command requires writing to multiple bands;

when the write command requires writing to multiple bands, splitting the write command into operations for each of the multiple bands; and executing the operations on the multiple bands.

15. The method of claim 11, further comprising receiving the write command via an interface from a host device.

16. A computer-readable storage device storing instructions which cause a processor to perform a method comprising:

receiving a write command to store received data to a first band of tracks of a first data storage medium, each band of tracks including multiple adjacent tracks that are at least partially overlapped;

reading previously stored data from the first band of tracks;

modifying the previously stored data with the received data to generate first modified data;

determining whether to write the first modified data to the first band of tracks or a second band of tracks not including tracks from the first band of tracks based upon upon whether target logical block addresses (LBAs) corresponding to the received data from the write command are located within a number of last tracks of the first band of tracks; and writing the first modified data to the determined first band of track or second band of tracks.

17. The computer-readable storage device of claim 16, the method further comprising:

determining whether target logical block addresses (LBAs) corresponding to the received data from the write command are located in the last X tracks of the first band of tracks, where X is a number of tracks;

when the target LBAs are not in the last X tracks, performing a first operation including:

reading the previously stored data from the first band of tracks;

generating the first modified data;

writing the first modified data to the second band of tracks;

assigning a first data storage location indicator previously identifying the first band of tracks to identify the second band of tracks in a mapping table;

modifying the mapping table to indicate the first band of tracks is a spare band and is available for storing data;

when the target LBAs are in the last X tracks, performing a second operation including:

reading target data from a first track containing the target LBAs of the first band of tracks to a last track of the first band of tracks;

modifying the target data with the received data to generate second modified data;

writing the second modified data to a scratch pad, a scratch pad being an area of nonvolatile memory reserved for temporary storage during band writing operations; and writing the second modified data to the first band of tracks.

18. The computer-readable storage device of claim 17, the method further comprising X is equal to or less than half the total number of tracks in the first band of tracks.

19. The computer-readable storage device of claim 16, the method further comprising:

determining if the write command requires writing to multiple bands;

when the write command requires writing to multiple bands, splitting the write command into operations for each of the multiple bands; and executing the operations on the multiple bands.

20. The computer-readable storage device of claim 16, further comprising:

the first data storage medium is divided into a plurality of zones, at least one zone includes a plurality of bands including the first band of tracks and the second band of tracks;

a usable storage capacity of a zone that is available to store data includes the storage capacity of the plurality of bands in the zone reduced by at least the capacity of spare bands in the zone; and the first band of tracks and the second band of tracks each have sufficient capacity to hold all the data from the other band, in order to allow swapping of data between bands.

* * * * *